Aug. 14, 1945.    W. G. TENNEY    2,381,938
BATTERY TERMINAL
Filed Aug. 2, 1943
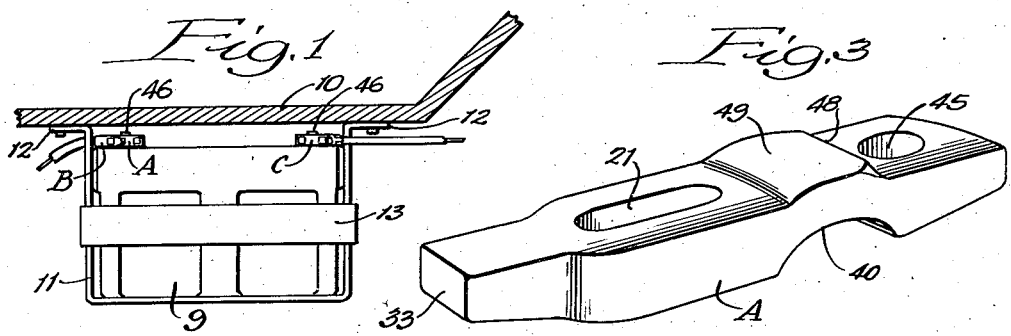
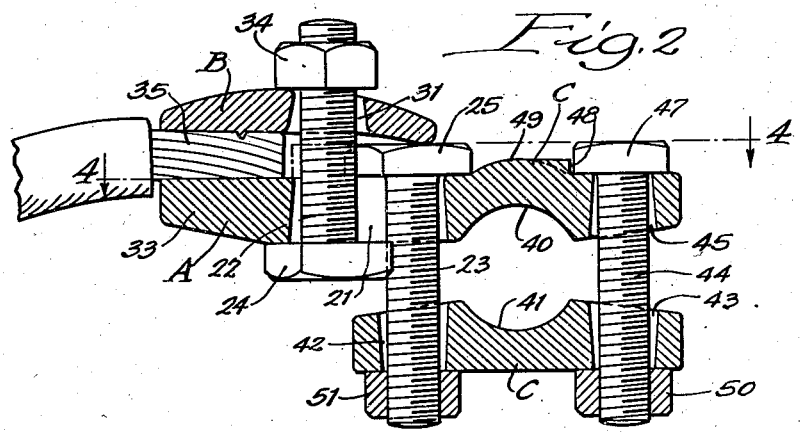
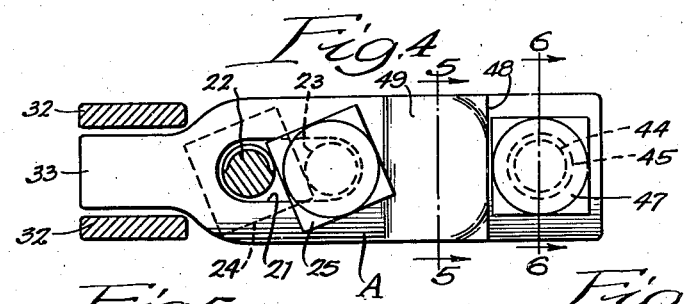
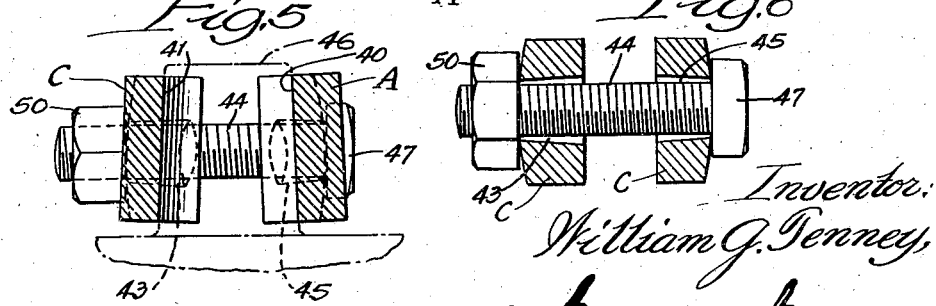
Inventor:
William G. Tenney,
By [signature]
Attorneys Patented Aug. 14, 1945

2,381,938

UNITED STATES PATENT OFFICE 2,381,938

BATTERY TERMINAL

William G. Tenney, Chicago, Ill.

Application August 2, 1943, Serial No. 496,976

6 Claims. (Cl. 173—259)

This invention relates to a battery terminal, and has for its object the provision of such a terminal which is simple, sturdy, self-adjusting, and easily operated. More detailed objects will appear in the following description and in the drawing wherein:

Figure 1 is a view in elevation of a pair of the present terminals attached to a battery which is supported from beneath an automobile floor board (shown in section);

Fig. 2 is a longitudinal horizontal section taken through the terminal;

Fig. 3 is a view in perspective of the bar forming the jaw-clamp;

Fig. 4 is a view in section, taken on line 4—4 of Fig. 2;

Fig. 5 is a detail in section, taken on line 5—5 of Fig. 4, a battery post being here shown in dotted lines; and Fig. 6 is a similar view taken on line 6—6 of Fig. 4.

In Fig. 1 there is illustrated a battery 9 which may be of the type conventionally used in automobiles, mounted below a floor board 10 in a box formed by a depending bracket 11 secured at its ends 12 to the underside of the floor board by any appropriate means (not shown). Side straps 13 may connect with the bracket to secure the battery against lateral displacement in the box. While the space between the battery top and the underside of the floor board is shown as rather close yet it is sufficient for accommodation of the present terminals which occupy but very little vertical space. In the attainment of this end the movable parts of my terminal operate in a plane adjacent and parallel to the battery top.

The components of my terminal are (1) a pair of cable-engaging jaws one of which doubles as a post-engaging clamp, and (2) a second clamp coacting with the jaw-clamp first mentioned for engaging one of the battery posts. These parts which may be produced from a suitable metal, and which are interconnected by three bolts two of which are interengaged to prevent rotation of themselves, will now be described in detail.

A bar A which serves as the jaw-clamp is formed with a through slot 21 through which may be inserted the shanks of two bolts 22 and 23 having polygonal heads 24 and 25, respectively, adapted to bear against opposite faces of the bar, a facet of each bolt head lying adjacent the shank of the other bolt, as shown. The fit of each bolt shank within the slot is rather loose both to facilitate insertion of the bolts and to permit of limited self-adjusting movement of the bar relative thereto. Each bolt which occupies a position near an end of the slot is prevented thereby from shifting away from the other to an extent which would provide clearance for the head of the adjacent bolt, so that a rotative lock for each bolt is maintained at all times.

Coacting with one face of the bar, along one end portion thereof, is a second jaw B which, as shown, is slightly arcuate endwise, being formed with a through opening 31 longitudinally off-center. A pair of spaced cheeks 32 (see Fig. 4) are also extended off-center oppositely to define between them a channel facing toward the bar A, and within this channel may be received a tongue 33 formed by a narrowing of the bar end region at this point. The jaw end opposite the cheeks is a fulcrum which bears against the bolt head 25, whereby the fulcrum end of the jaw is maintained in spaced relation to the bar A. Through the jaw opening 31 the bolt 22 is extended to receive thereon a threaded nut 34 which bears against the outer face of the jaw B. The opening 31 is slightly larger than the bolt inserted therethrough, and desirably is tapered or beveled to a larger diameter toward the inner face of the jaw, thereby to permit it to freely execute angular adjusting movements relative to the bolt. A cable end 35 may be positioned between the two cheeks so as to be engaged on one side by the bar tongue 33 and on the other by the resistance end of the jaw B which is, in effect, a lever of the third class. With advance of the nut 34 upon the bolt 22 an acting force is exerted upon this lever such as to engage tightly the cable end that lies between the jaws, thereby providing a secure connection between the cable and the terminal fitting.

The bar end opposite the jaw B serves as a coacting jaw for engagement of a cable end. The remote bar end which serves as a clamp is formed on its face opposite the jaw with a concave seat 40 facing a complementary seat 41 which is formed on a second clamp C through which are a pair of openings 42 and 43 spaced apart beyond the seat, the opening 42 being aligned with the bolt 23 and the opening 43 in line with a third bolt 44 which is freely received within an opening 45 extending through the clamp C. Each of the openings 42, 43 and 45 is desirably outwardly tapered slightly toward the confronting faces of the clamp elements. The threaded shanks of the bolts 23 and 44 are positioned to lie to the outside of a generally cylindrical object that may be accommodated between the facing seats 40 and 41 of the bar B and clamp C, the intended object being one of the posts 46 (see Fig. 5) which upstands from the top of the battery. The polygonal head 47 of the bolt 44 bears against the bar face which is opposite the seat 40, one facet of the bolt head lying adjacent a shoulder 48 at the end of a reinforcing boss 49 between the bar slot 21 and opening 45. The bolt 44 is accordingly prevented from turning when a threaded nut 50 applied to its opposite end is rotated thereon to advance the clamp C toward the bar. Upon the bolt 23 is fitted a nut 51 adapted to be operated along with the nut 50 so that both ends of the clamp C may be advanced toward the battery post upon which the terminal is to be secured. At the points where the bolt heads 25 and 47 and the nuts 50 and 51 engage with the clamping elements, the surfaces of these elements are transversely convex (see Figs. 3 and 6) to maintain a slight clearance between such surfaces and the peripheral edges of these heads and nuts. This circumstance, plus the tapered character of the openings traversed by the bolts 23 and 44, makes possible rocking movements of the bar and clamp as required for self-adjustment thereof upon posts of varying contour, etc., and their confronting end faces, in whole or in part, may also, if desired, be diverged outwardly for greater amplitude in such adjusting movements all as clearly indicated in Fig. 2. In any such rocked position, the heads and nuts will refrain from biting into or chewing the clamp surfaces with which they are in engagement.

The battery terminal of this invention is compact, effective and very simple. Two of the connecting bolts are interengaged for mutual locking against rotative movement, and when thus related the head 25 of one bolt becomes a bearing point for the fulcrum of a jaw against which an acting force is exerted by the nut 34 upon the other bolt. The bolt head 25 which serves as a bearing point also acts as a spacer block for the jaw, thereby minimizing the metal required for proper support of its fulcrum end. Also when the cable is secured between the jaws by tightening of the nut 34 on the bolt 22, the resulting pressure upon the head 25 of the bolt 23 will act to hold that bolt immovably in position to receive thereon the clamp C and, because of this steady holding of the bolt, application of the terminal to the battery post 46 will be facilitated. The terms "jaws" and "clamps," as used herein, have been chosen as convenient designations for a pair of coacting elements in each case, the expression "jaw" denoting one of two parts between which there is relative rocking or pivotal movement, and the expression "clamp" indicating a part which is a whole is movable toward and from its coacting part.

I claim:

1. A battery terminal comprising a bar formed at one end into a jaw and reversely at its opposite end into a clamp, a second jaw coacting with the jaw end of the bar, a second clamp coacting with the clamp end of the bar, three threaded bolts extending through the bar, one of them through the second jaw and two of them through the second clamp, polygonal heads on two of the bolts each in engagement with the shank of the other bolt to provide a mutual lock against rotation and one of the bolt heads affording a fulcrum bearing for the second jaw, and nuts threaded on to the bolts adapted, when advanced, to bear against the second jaw and second clamp for producing coaction thereof with the bar.

2. A battery terminal comprising a bar formed at one end into a jaw and at its opposite end into a clamp, a second jaw coacting with the jaw end of the bar, a second clamp coacting with the clamp end of the bar, a pair of bolts extending through the bar, one of them through the second jaw and the other through the second clamp, and a polygonal head on one bolt in engagement with the other bolt thereby to be held against rotative movement, one of the bolts heads being also engaged by the second jaw and providing a fulcrum bearing therefor.

3. A battery terminal comprising a bar formed at one end into a jaw having an adjacent through opening, a second jaw having a through opening coacting with the jaw end of the bar, a threaded bolt extending through the bar opening and through the jaw opening as well, a fulcrum bearing for the second jaw comprising a polygonal head engaging with the bar and engaged by the second jaw, the head having a shank extended therefrom through the bar opening, a polygonal head on the bolt in engagement with the shank thereby to be held against rotation and a nut threaded upon the bolt traversing the second jaw adapted, when rotated in one direction, to advance said jaw toward the jaw end of the bar with consequent axial pressure on the shank head with which the second jaw is engaged.

4. A battery terminal comprising a bar formed at one end into a jaw having an adjacent through slot extending lengthwise thereof, a second jaw having a through opening coacting with the jaw end of the bar, a threaded bolt extending through the bar slot and through the jaw opening as well, a fulcrum bearing for the second jaw comprising a polygonal head engaging the bar and bolt and engaged by the second jaw, the head having a shank extended therefrom through the bar opening, a polygonal head on the bolt in engagement with the shank and both heads acting to maintain the bolt and shank in positions adjacent opposite ends of the slot and to prevent rotation thereof, and a nut threaded upon the bolt traversing the second jaw adapted, when rotated in one direction, to advance said jaw toward the jaw end of the bar with consequent axial pressure on the shank head with which the second jaw is engaged.

5. A battery terminal comprising a bar formed at one end into a clamp having on one face a concave seat, there being a pair of openings through the bar, one to each side of the seat, a pair of threaded bolts loosely entered through the openings with heads abutting the bar on the face thereof opposite the seat, the bar being formed at its opposite end into a jaw, a second jaw coacting with the jaw end of the bar and having a fulcrum in engagement with one of the bolt heads which is adapted to serve as a bearing point therefor, means for forcing one jaw by a rocking movement toward the other jaw whereby to exert an axially directed pressure against the engaged bolt head to hold the said bolt rigid with respect to the bar, a second clamp having on one face a concave seat complementary to that on the bar and formed with a pair of openings in register with those in the bar adapted to loosely receive therethrough the two bolts, the clamp outer face opposite the seat being transversely convex at point adjacent the two openings, and a nut in screw-threaded connection with each bolt adapted, when rotatively advanced thereupon, to engage with the clamp outer face only at points proximate to the bolt whereby to minimize interference to rocking movement of the second clamp upon the two bolts.

6. A battery terminal comprising a bar formed at one end into a jaw, a second jaw coacting with the jaw end of the bar, there being through the bar and jaw registering openings, a fulcrum bearing for the second jaw comprising a head in engagement with the bar and formed with a shank extended into the opening thereof, a threaded bolt extending through the registering openings of the bar and jaw, and a nut fitted operatively on to the bolt and movable lengthwise thereof to impart adjusting movements to the jaw relative to the bar, the shank head being positioned between the bar and one end of the second jaw and adapted to serve as a fulcrum bearing point therefor when receiving axial pressure therefrom as the jaw is advanced toward the bar.

WILLIAM G. TENNEY.